United States Patent [19]

Ishihara

[11] Patent Number: 4,814,393

[45] Date of Patent: Mar. 21, 1989

[54] COMPOSITION OF GRAFT MODIFIED POLYPHENYLENE ETHER AND POLYCARBONATE

[75] Inventor: Toshio Ishihara, Oyadai-machi, Japan

[73] Assignee: General Electric Company, Mt. Vernon, Ind.

[21] Appl. No.: 113,099

[22] Filed: Oct. 26, 1987

[51] Int. Cl.$^4$ .............................................. C08L 71/04
[52] U.S. Cl. .................................. 525/394; 525/391; 525/462; 525/905
[58] Field of Search ................ 525/391, 394, 905, 462

[56] References Cited

U.S. PATENT DOCUMENTS

| | | | |
|---|---|---|---|
| 4,097,556 | 6/1978 | Toyama et al. | 525/68 |
| 4,485,219 | 11/1984 | Falk | 525/394 |
| 4,654,405 | 3/1987 | Jalbert | 525/391 |

FOREIGN PATENT DOCUMENTS 59-724  4/1984  Japan .

Primary Examiner—Theodore E. Pertilla
Attorney, Agent, or Firm—Martin B. Barancik

[57] ABSTRACT

A composition essentially free of polyester which comprises an admixture of a. about 1 to 96 weight percent of an aromatic polycarbonate, and
b. about 4 to 99 weight percent of a graft modified polyphenylene ether, said modification being the residue of a reaction between a non-endcapped polyphenylene ether with a compound selected from the group consisting of aliphatic unsaturated dicarboxylic acids, aliphatic unsaturated dicarboxylic acid precursors, aliphatic unsaturated dicarboxylic acid ester precursors, and aliphatic unsaturated dicarboxylic acid esters, the total weight percent being the combination of the aromatic polycarbonate and graft modified polyphenylene ether.

13 Claims, No Drawings

COMPOSITION OF GRAFT MODIFIED POLYPHENYLENE ETHER AND POLYCARBONATE

BACKGROUND OF THE INVENTION

Aromatic carbonate resins such as polycarbonate resins are thermoplastic resinous materials possessing many excellent physical and chemical properties which render them useful in a wide range of applications. They exhibit, for example, excellent properties of toughness, impact resistance, heat resistance and dimensional stability, optical clarity or non-opaqueness, and physiological inertness. Because of their excellent property spectrum, polycarbonate resins are used in various utilities including various molded and extruded articles. The polyphenylene ethers are also a well known group of polymers. These polymers are characterized by good thermal characteristics and good hydrolytic stability. For many years, researchers have attempted to wed the good characteristics of both polycarbonates and polyphenylene ethers by blending them in many different ways, preparing copolymers or adding miscibilizing agents. These efforst have met with little success. Generally, the problem that arises when the two polymers are admixed is that the melt state becomes unstable. This problem manifests itself in the admixture of the two polymers by an observed brittleness that makes it difficult to mold pieces therefrom and low impact strengths accompanied by brittle break when such articles can be molded.

It has now been discovered that such blends of aromatic polycarbonate and polyphenylene ether can be prepared with desirable properties when a graft modification polyphenylene ether is employed. The graft modification occurs through the chemical reaction of the polyphenylene ether with an aliphatic unsaturated dicarboxylic acid, dicarboxylic acid precursor or a carboxylic acid ester precursor.

This new composition provides a spectrum of benefits which depends upon the quantity of the aromatic polycarbonate or the polyphenylene ether. Impact modifiers may be added for increased impact resistance and ductility of the composition. It is believed that some covalent bonding between the polycarbonate and the graft modified polyphenylene ether can possibly occur during processing.

SUMMARY OF THE INVENTION

In accordance with the invention, there is a composition essentially free of polyester which comprises an admixture of about 1 to 96 weight percent of
(a) an aromatic polycarbonate, and about 4 to 99 weight percent of
(b) a graft modified polyphenylene ether, said modification being the residue of a reaction between a nonendcapped polyphenylene ether with a compound selected from the group consisting of aliphatic unsaturated dicarboxylic acid, aliphatic unsaturated dicarboxylic acid precursors, aliphatic unsaturated dicarboxylic acid estes and aliphatic unsaturated dicarboxylic acid ester precursors.

DETAILED DESCRIPTION OF THE INVENTION

The aromatic polycarbonate useful herein can generally be prepared by the reaction of at least one dihydric phenol and a carbonate precursor such as phosgene, a haloformate, or a carbonate ester. Generally speaking, such polycarbonate resins may be typified as being comprised of at least one recurring structural unit represented by the formula

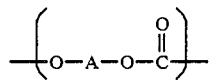

wherein A is a divlanet aromatic residue of the dihydric phenol employed in the polymer forming reaction. Preferably, the polycarbonate polymers used to provide the articles of the instant invention have an intrinsic viscosity (as measured in methylene chloride at 25° C.) ranging from about 0.3 to about 1.7 dl/gm. The dihydric phenols which may be employed to provide such aromatic carbonate polymers may be represented by the general formula

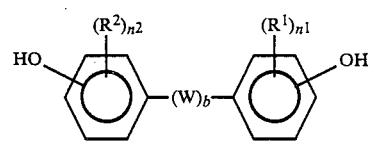

wherein:

$R^2$ is independently selected from halogen, monovalent hydrocarbon, monovalent hydrocarbonoxy radicals and hydrocarboncarboxy radicals;

$R^1$ is independently selected from halogen, monovalent hydrocarbon, monovalent hydrocarboncarboxy radicals and hycrocarboncarboxy radicals;

W is selected from divalent hydrocarbon radicals,

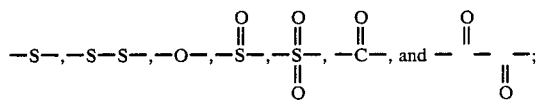

$n^2$ and $n^1$ are independently selected from integers having a value from 0 to 4 inclusive; and b is either zero or one.

The monovalent hydrocarbon radicals represented bykyl $R^2$ and $R^1$ include the alkyl, cycloaklyl, aryl, aral and alkaryl radicals. The preferred alkyl radicals are those containing from 1 to about 12 carbon atoms. The preferred cycloalkyl radicals are those containing from about 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by $R^2$ and $R^1$ are chlorine and bromine.

The divalent hydrocarbon radicals represented by W include the alkylene, alkylidene, cycloalkylene, and cycloalkylidene radicals. The preferred alkylene radicals are those which contain from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by $R^2$ and $R^1$ may be represented by the formula —$OR^3$ wherein $R^3$ is a monovalent hydrocarbon radical of the type described hereinafore for $R^2$ and $R^1$. Preferred monovalent hydrocarbonoxy radicals are the alkoxy and aryloxy radicals. Preferred hydrocarboncarboxy radicals are acetoxy and benzoyl radicals.

Some illustrative non-limiting examples of the dihydric phenols falling within the scope of the Formula II include:
2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(hydroxyphenyl)cyclododecane;
1,1-bis(3,5-dimethyl-4-hydroxyphenyl)cyclododecane;
4,4'-dihydroxydiphenyl ether;
4,4'-thiodiphenol;
4,4'-dihydroxy-3,3'-dichlorodiphenyl ether; and
4,4'-dihydroxy-2,5-dimethyldiphenyl ether.

Other useful dihydric phenols which are also suitable for use in the preparation of the above polycarbonates are disclosed in U.S. Pat. Nos. 2,999,835; 3,028,365; 3,334,154; and 4,131,575, all of which are incorporated herein by reference.

These aromatic polycarbonates can be manufactured by known processes, such as, for example and as mentioned above, by reacting a dihydric phenol with a carbonate precursor, such as phosgene, in accordance with methods as set forth in the above-cited literature and U.S. Pat. Nos. 4,018,750 and 4,123,436, incorporated herein by reference, or by transesterification processes such as disclosed in U.S. Pat. No. 3,153,008, incorporated by reference, as well as other processes known to those skilled in the art.

It is possible to employ two or more different dihydric phenols or a copolymer of a dihydric phenol with glycol or with a hydroxy or acid terminated polyester or with a dibasic acid in the event a carbonate copolymer or interpolymer rather than a homopolymer is desired for use in the preparation of the polycarbonate mixture of the invention. Branched polycarbonates are also useful, such as those described in U.S. Pat. No. 4,001,184, incorporated herein by reference. Also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use herein is a homopolymer derived from 2,2-bis(4-hydroxyphenyl)propane (bisphenol-A).

The polyethylene ethers used in the present invention are a well known calss of polymers. They are widely used in industry, especially as engineering plastics in applications requiring toughness and heat resistance. Since their discovery, they have given rise to numerous variations and modifications, all of which are applicable to the present invention, including but not limited to those described hereinafter.

The polyphenylene ethers comprise a plurality of structural units having the formula

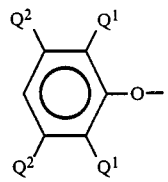

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, espedcially $C_{1-4}$ alkyl and each $Q^2$ is hydrogen. Suitable polyphenylene ethers are disclosed in a large number of patents.

Both homopolymer and copolymer polyphenylene ethers are included. Suitable homoplymers are those containing, for example, 2,6-dimethyl,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000 as determined by gel permeation chromatography. Its intrinsic viscosity is most often in the range of about 0.25–1.0 dl/g, as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst sytems consists of those containing a copper compound. Such catalysts are disclosed, for example, in U.S. Pat. Nos. 3,306,874; 3,306,875; 3,914,266 and 4,028,341. They are usually combinations of cuprous or cupric ions, halide (i.e. chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, σ-hydroxyaromatic aldehydes, σ-hydroxyazo compounds, ω-hydroxyoximes (monomeric and polymeric), σ-hydroxyaryl oximes and β-diketones. Also useful are known cobalt containing catalyst systems. Suitable manganese and cobalt containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

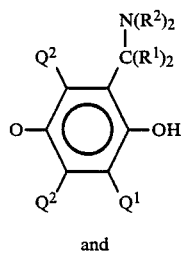

and

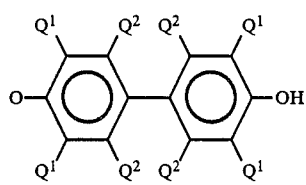

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ or primary alkyl radical. Preferably, each $R^1$ is hydrogen and each $R^2$ is alkyl, especially methyl or n-butyl.

Polymers containing the aminoalkyl substituted end groups of Formula IV may be obtained by incorporating an appropriate primary or secondary monoamine as one of the constituents of the oxidative coupling reaction mixture, especially when a copper or manganese containing catalyst is used. Such amines, especially the dialkylamines and preferably di-n-butylamine and di-methlamine, frequently become chemically bound to the polyphenylene ether, most often by replacing one of the o-hydrogen atoms on one or more $Q^1$ radicals. The principal site of reaction may be the $Q^1$ radical adjacent to the hydroxy group on the terminal unit of the polymer chains. During further processing and/or blending, the aminoalkyl-substituted end groups may undergo various reactions, possibly involving a quinone methide type intermediate of the formula

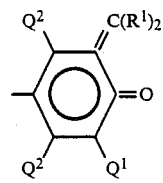

with numerous beneficial effects often including an increase in impact strength and compatibilization with other blend components. Reference is made to U.S. Pat. Nos. 4,054,552; 4,092,294; 4,477,649; 4,477,651 and 4,517,341, the disclosures of which are incorporated by reference herein.

Polymers with 4-hydroxybiphenyl end groups of Formula V are typically obtained from reaction mixtures in which a by-product diphenoquinone of the formula

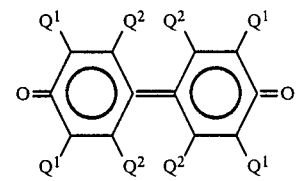

is present, especially in a copper-halide-secondary or tertiary amine system. In this regard, the disclosure of U.S. Pat. No. 4,477,649 is again pertinent as are those of U.S. Pat. No. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas IV and V. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variation in structural units or ancillary chemical features.

The grafting agent for the polyphenylene ethers is selected from the group consisting of aliphatic unsaturated dicarboxylic acids, aliphatic unsaturated dicarboxylic acid precursors and aliphatic unsaturated dicarboxylic acid esters and aliphatic unsaturated dicarboxylic acid ester precursors. Generally, up to 16 carbon atoms are in the grafting agent. Examples of the unsaturated dicarboxylic acids included fumaric acid, maleic acid, itaconic acid, chloromaleic acid and citraconic acid. Further examples of aliphatic unsaturated acids also include norbornene dicarboxylic acid and tetrahydrophthalic acid. Examples of unsaturated aliphatic diacid precursors include maleic anhydride, itaconic anhydride as well as norbornene dicarboxylic anhydride, dimethyl maleic anhydrice and tetrahydrophthalic anhydride. Examples of aliphatic, unsaturated diacid esters include methyl furmarate, phenyl maleate, butyl citraconate and isopropyl fumarate. Examples of aliphatic unsaturated dicarboxylic acid ester precursors include fumaric chloride, sodium maleate, itaconic acid chloride and norbornene dicarboxylic acid chloride.

The polyphenylene ethers can be modified with the grafting agent by standard reaction techniques. For example, the polyphenylene ether resin can be placed in an organic solvent such as toluene or chloroform, and reacted with the grafting agent temperatures up to the refluxing temperature of the solvent. Alternatively and more efficiently the grafting reaction can run while the polyphenylene ether is in an extruder. By merely adding the grafting agent to the polyphenylene ether in the extruder together with other additives if desired, the grafting agent reacts with the molten polyphenylene ether in the extruder at the typical extrusion temperature. For complete reaction, it is preferred to re-extrude the mixture through a single screw extruder. The quantity of graft agent used in the reaction is any quantity which will bring about the enhancement in properties observed in the polycarbonate modified polyphenylene ether blend. Generally, a minimum of about 0.01 weight percent based on the polyphenylene ether is sugficient. A maximum of about 5.0 weight percent generally need not be exceeded since further positive enhancement of the blend does not readily occur. A preferred range is from about 0.1 to 2.5 weight percent. If the grafting agent has a relatively low boiling point and may volatilize from the extruder prior to reaction, such quantity should be compensated for initially. Generally the extruder is held at from about 250° to about 350° C. during the grafting reaction.

The graft modified polyphenylene ether is admixed with the polycarbonate in the solid state with Banbury rollers, or other state of the art equipment and then extruded together, generally at a temperature from about 240° to about 350° C. The extruded material is then molded into an article at a temperature of from about 240° to about 350° C.

The admixture will generally have from about 4 to 99 weight percent of the graft modified polyphenylene ether and 1 to 96 weight percent aromatic polycarbonate, the weight percent calculated on the basis that the aromatic polycarbonate plus the modified polyphenylene ether is equal to one hundred weight percent. The enhanced properties of the blend are on a continuum. Obviously, the composition will not have the same properties with a 4:96 polyphenylene ether:polycarbonate admixture as a 99:1 polyphenylene ether:polycarbonate admixture. Generally, when there is a major quantity of polycarbonate and a minor quantity of modified polyphenylene ether, the admixture will have a higher melt strength than polycarbonate alone and as a consequence will be less brittle than a polycarbonate unmodified polyphenylene ether of the same weight percents. The melt strength should be sufficiently high that parts with relatively large voids can be successfully blow molded without utilizing a branched resin as opposed to the normal polycarbonate compositions. Additionally the exterior of the molded part has significantly less gloss as measured at 60° C. on a glossmeter than a polycarbonate composition. Where there are significant amounts of modified polyphenylene ether and the impact resistance, as measured by ⅛ inch Notched Izod ASTM D256, is relatively low, the composition can be readily upgraded in this property by the addition of impact modifiers, such as styrene-butadiene, hydrogenated butadiene-styrene block copolymer acrylate core shell, random block polycarbonate poly diorganosiloxane copolymer, polyolefin and the like. U.S. Pat. No. 4,522,980 is incorporated by reference. Particularly interesting is that relatively large quantities of imapct modifiers, particularly polyolefins, can be added to the polycarbonate composition, obtain impact modification and maintain the compatibility of the composition—that is, no delamination is observed. As the mixture moves down the continuum to more and more modified polyphenylene ether, the distinguishing properties become a higher DTUL in comparison to polycarbonate alone and a higher melt strength. Preferred mixtures are 85–95 weight percent polycarbonate and 5–15 weight percent modified polyphenylene ether and 90–98 weight percent modified polyphenylene ether and 2–10 weight percent polycarbonate.

As is noted, the inventive compositions are essentially free of other polyesters, particularly polyalkylene phthalates and also resins having cycloalkylene containing monomers and polyarylates.

EXAMPLES

Fumarate (maleate) modified polyphenylene ethers were prepared by extrusion of 2,6-dimethyl-polyphenylene ether with either 0.7 or 3.0 phr of fumaric acid or maleic anhydride. Fumaric acid modified material is designated as PPO-FA. Maleic anhydride material is designated as PPO-MA. Extrusion was usually performed on a single screw extruder, temperature approximately 300° C., 150 RPM. To inusre complete incorporation of unsaturated diacid most materials were extruded twice.

Blends of the modified polyphenylene ether with polycarbonate were prepared by mixing the appropriate materials and extruding at 275° C.–300° C. The extrudate was pelletized, dried and injection molded.

The properties listed in the Tables were measured according to standard ASTM procedure.

Izod ASTM D256 was used for the imapct measurements.

HDT was measured by ASTM D648.

The Kasha Index is a measurement of the melt viscosity of the resin. The procedure for determining the Kasha Index is as follows: 7 grams of resin pellets, dried a minimum of 90 minutes at 125° C. are added to a modified Tinius-Olsen model T3 melt indexer; the temperature in the indexer is maintained at 300° C. and the resin is heated at this temperature for 6 minutes; after 6 minutes the resin is forced through a 1.05 mm radius orifice using a plunger of radius 4.7 mm and an applied force of 7.7 kgs. The time required for the plunger to travel 5.1 cm is measured in centiseconds; this is reported as the KI. The higher the KI, the higher the melt viscosity and the more viscous the resin, and the harder or more difficult the processability.

VV-PPO is vacuum vented polyphenylene oxide which was used in comparison with the chemically modified polyphenylene oxide. THe intrinsic viscosity of the vacuum vented PPO at 30° C. in chloroform is 0.46 dl/g.

The bisphenol-A polycarbonate (PC) has an intrinsic viscosity in methylene chloride at 30° C. of about 0.53-0.56 dl/g.

The polyphenylene oxide (PPO) used is 2,6-dimethyl-1,4-phenylene oxide with an intrinsic viscosity of 0.50 dl/g as measured at 30° C. in chloroform. KG 1651 is a selectively hydrogenated block copolymer of styrene-ethylene butylene-styrene obtained from Shell.

Below are the results of the experiments:

TABLE I

| EXAMPLE | CONTROL | 1 | 2 |
|---|---|---|---|
| PC | 90 | 90 | 90 |
| PPO Powder | 10 | — | — |
| VV-PPO | — | 10 | — |
| PPO-FA 3% | — | — | 10 |
| Flex str. (psi) | 13900 | 14000 | 14200 |
| Flex Mod (psi) | 338000 | 337000 | 335000 |
| DTUL °C. @ 264 psi | 128 | 136 | 134 |
| ⅛" N. Izod ft-lbs/in | 2.9 | 1.9 | 6.3 |
| KI (c sec) | 5160 | 7000 | 8640 |
| Gloss (60°) | 51 | 45 | 61 |

When using large quantities of polycarbonate, the chemically modified PPO provided much greater impact strength and higher DTUL. Gloss is reduced vs unmodified PC (60° gloss=100).

TABLE II

| EXAMPLE | CONTROL | 3 | 4 | 5 |
|---|---|---|---|---|
| PC | 50 | 50 | 50 | 50 |
| PPO Powder | 50 | — | — | — |
| VV-PPO | — | 50 | — | — |
| PPO-FA (0.7%) | — | — | 50 | — |
| PPO-FA (3%) | — | — | — | 50 |
| Tens. Str (Y) psi | 10100 | 10000 | 10200 | 10300 |
| DTUL °C. @ 264 psi | 138 | 145 | 144 | 144 |
| ⅛" N. Izod ft-lbs/in. | 0.5 | 0.9 | 0.8 | 1.0 |
| ⅛" Un. Izod ft-lbs/in. | 19 | — | 31 | >80 |
| KI (c sec) | 3230 | 12460 | 7360 | 7200 |

As shown in Table II, equal weight percents of polycarbonate and PPO wherein the PPO is acid modified will bring about an increase in impact strength in the unnotched state. Higher levels of acid modification give proportionately higher impact strength.

TABLE III

| EXAMPLE | CONTROL | 6 | 7 |
|---|---|---|---|
| PC | 10 | 10 | 10 |
| PPO Powder | 90 | — | — |
| PPO-FA (0.7%) | — | 90 | — |
| PPO-FA (3.0%) | — | — | 90 |
| ⅛" Un. Izod ft-lbs/in. | 12 | 19 | 26 |

Table III demonstrated that even with very high quantities of PPO and low quantities of polycarbonate, the chemically modified PPO provides a significant increase in impact strength.

TABLE IV

| EXAMPLE | CONTROL | 8 | 9 | 10 | 11 |
|---|---|---|---|---|---|
| PC | 50 | 50 | 50 | 50 | 50 |
| PPO Powder | 35 | — | — | — | — |
| VV-PPO | — | 35 | — | — | — |
| PPO-FA (0.7%) | — | — | 35 | — | — |
| PPO-FA (3.0%) | — | — | — | 35 | — |
| PPO-MAH (3.0%) | — | — | — | — | 35 |
| KG 1651 | 15 | 15 | 15 | 15 | 15 |
| Tens. Str (Y) psi | 6500 | 7000 | 6900 | 7000 | 7200 |
| Tens. Str (B) psi | 7700 | 8200 | 7600 | 8600 | 8900 |
| % Elong | 77 | 76 | 63 | 81 | 82 |
| Flex. Str. (psi) | 9800 | 10200 | 10300 | 10400 | 11200 |
| Flex. Mod (psi) | 233000 | 241000 | 247000 | 249000 | 271000 |
| DTUL °C. @ 264 psi | 134 | 138 | 138 | 140 | — |
| ⅛" N. Izod ft-lbs/in | 5 | 12 | 13 | 14 | 22 |
| ¼" N. Izod ft-lbs/in | 5 | 17 | 18 | 26 | 16 |
| KI (c sec) | 11800 | 19700 | 14100 | 14200 | 10090 |

Table IV provides data showing increased impact strength with Kraton G type impact modified majority polycarbonate minority PPO composition wherein PPO is chemically modified.

TABLE V

| EXAMPLE | CONTROL | 12 | 13 |
|---|---|---|---|
| PPO Powder | 55 | — | — |
| PPO-FA (0.7%) | — | 55 | — |
| PPO-FA (3%) | — | — | 55 |
| KG 1651 | 15 | 15 | 15 |
| PC | 30 | 30 | 30 |
| ⅛" N. Izod | 2 | 11 | 18 |
| ¼" N. Izod | 3 | 10 | 10 |
| KI (c sec) | 20200 | 31700 | 26600 |

Impact modified compositions of large quantities of PPO and smaller quantities of polycarbonate show improved impact strength when the PPO is chemically modified.

TABLE VI

| EXAMPLE | CONTROL | 14 | 15 |
|---|---|---|---|
| PPO Powder | 20 | — | — |
| PPO-FA (3%) | — | 20 | — |
| PPO-MA (3%) | — | — | 20 |
| KG 1651 | 10 | 10 | 10 |
| PC | 70 | 70 | 70 |
| ⅛" N. Izod ft-lbs/in | 10 | 11 | 12 |
| ¼" N. Izod ft-lbs/in | 10 | 14 | 13 |
| KI (c sec) | 7900 | 9800 | 9100 |
| Gloss 60° | 20 | 25 | 31 |

Impact modified compositions with large quantities of polycarbonate and low quantities of PPO show improved impact strength when the PPO is chemically modified. Gloss is substantially reduced vis polycarbonate.

What is claimed is:

1. A composition essentially free of polyester which comprises an admixture of
   a. about 1 to 96 weight percent of an aromatic polycarbonate, and
   b. about 4 to 99 weight percent of a graft modified polyphenylene ether, said modification being the residue of a reaction between a non-endcapped polyphenylene ether with a compound selected from the group consisting of aliphatic unsaturated dicarboxylic acids, aliphatic unsaturated dicarboxylic acid precursors, aliphatic unsaturated dicarboxylic acid ester precursors, and aliphatic unsaturated dicarboxylic acid esters, the total weight percent being the combination of the aromatic polycarbonate and graft mofidied polyphenylene ether.

2. The composition in accordance with claim 1 wherein the compound is an aliphatic unsaturated dicarboxylic acid or aliphatic unsaturated dicarboxylic acid precursor.

3. The composition in accordance with claim 2 wherein the compound is an aliphatic unsaturated dicarboxylic acid.

4. The composition in accordance with claim 3 wherein the compound is fumaric acid.

5. The composition in accordance with claim 2 wherein the compound is an aliphatic unsaturated dicarboxylic acid precursor.

6. The composition in accordance with claim 3 wherein the compound is maleic anhydride.

7. The composition in accordance with claim 1 wherein the quantity of compound used in the reaction is from about 0.01 to 5.0 weight percent based on the polyphenylene ether.

8. The composition in accordance with claim 7 wherein the quantity is from about 0.7 to 3.0 weight percent.

9. The composition in accordance with claim 1 wherein the aromatic polycarbonate is from about 85–95 weight percent and the modified polyphenylene ether is from about 5 to 15 weight percent.

10. The composition in accordance with claim 1 wherein the modified polyphenylene ether is from about 90–98 weight percent and the aromatic polycarbonate is from about 2 to 10 weight percent.

11. The composition in accordance with claim 1 wherein the aromatic polycarbonate is bisphenol-A polycarbonate.

12. The composition in accordance with claim 1 wherein the polyphenylene ether is poly(2,6-dimethyl-1,4-phenylene ether).

13. The composition in accordance with claim 12 wherein the aromatic polycarbonate is bisphenol-A polycarbonate.

* * * * *

UNITED STATES PATENT AND TRADEMARK OFFICE
CERTIFICATE OF CORRECTION

PATENT NO. : 4,814,393

DATED : March 21, 1989

INVENTOR(S) : Toshio Ishihara

It is certified that error appears in the above-identified patent and that said Letters Patent is hereby corrected as shown below:

Column 3

Line 59
"calss" should read "class"

Column 7

Line 32
"sugficient" should read "sufficient"

Column 8 line 13
"imapct" should read "impact"

Column 10

Line 52
"vis" should read "vs"

Signed and Sealed this

Tenth Day of July, 1990

Attest:

HARRY F. MANBECK, JR.

*Attesting Officer*    *Commissioner of Patents and Trademarks*